United States Patent [19]
Van Loenen

[11] Patent Number: 5,510,663
[45] Date of Patent: Apr. 23, 1996

[54] ELECTRODYNAMIC DEVICE

[75] Inventor: Evert J. Van Loenen, Eindhoven, Netherlands

[73] Assignee: U.S. Philips Corporation, New York, N.Y.

[21] Appl. No.: 394,540

[22] Filed: Feb. 22, 1995

Related U.S. Application Data

[63] Continuation of Ser. No. 223,472, Apr. 5, 1994, abandoned.

[30] Foreign Application Priority Data

May 13, 1993 [BE] Belgium ................................ 09300495

[51] Int. Cl.$^6$ ...................................................... H02K 3/00
[52] U.S. Cl. ........................... 310/179; 310/184; 310/156; 310/254; 310/268; 310/DIG. 6
[58] Field of Search ........................ 310/40 MM, DIG. 6, 310/68 R, 184, 267, 268, 309, 254, 156, 71, 179, 180

[56] References Cited

U.S. PATENT DOCUMENTS

| | | | |
|---|---|---|---|
| 3,189,808 | 6/1965 | Henry-Baudot et al. | 318/138 |
| 4,340,833 | 7/1982 | Sudo | 310/207 |
| 4,733,115 | 3/1988 | Barone | 310/68 R |
| 4,804,574 | 2/1989 | Osawa | 310/184 |
| 5,113,100 | 5/1992 | Taghezout | 310/40 MM |
| 5,252,881 | 10/1993 | Muller | 310/40 MM |
| 5,408,153 | 4/1995 | Imai et al. | 310/156 |

FOREIGN PATENT DOCUMENTS

| | | |
|---|---|---|
| 0246670A3 | 11/1987 | European Pat. Off. . |
| 92201654 | 11/1992 | European Pat. Off. . |
| 0574074 | 12/1993 | European Pat. Off. . |
| 1243838 | 9/1989 | Japan . |
| 665303A5 | 4/1988 | Switzerland . |
| 9007220 | 6/1990 | WIPO . |

Primary Examiner—R. Skudy
Attorney, Agent, or Firm—Edward Blocker

[57] ABSTRACT

An electrodynamic device such as an electric motor has a stator (16) comprising a substrate (41) in the form of a sheet or foil carrying a plurality of windings ($U_1$–$U_3$, $V_1$–$V_3$, $W_1$–$W_3$) comprising spiral coils (43, 45) on its upper and its lower side connected in series with one another, which stator has a number of phases (U, V, W) each comprising at least one winding. The device in accordance with the invention may comprise one or a plurality of such substrates (41), but each substrate always carries all the phases (U, V, W) present.

6 Claims, 7 Drawing Sheets

ELECTRODYNAMIC DEVICE

This is a continuation of application Ser. No. 08/223,472, filed Apr. 5, 1994, now abandoned.

BACKGROUND OF THE INVENTION

1. Field of the Invention

The invention relates to an electrodynamic device comprising a movable permanent-magnetic member (rotor) and an electromagnetic stator comprising a substrate such as a sheet or foil, a plurality of windings comprising spiral first and second coils which are electrically connected in series with one another via interconnections and which are situated, respectively, on the first and the opposite second side of the substrate, and a plurality of phases each comprising at least one winding.

As is common usage, "rotor" is to be understood to mean the moving member of the device. This implies that it need not be a rotating member although it may be such a member. Apart from being rotating the rotor may be translating or may perform a combined translation and rotation. The rotor may be disc-shaped or cylindrical. If the device forms an electric motor it may be of the axial-field type or the radial-field type.

2. Description of the Related Art

It is known (WO 90/07220) to provide a device of the type defined in the opening paragraph with a stator comprising a plurality of stacked substrates, each substrate carrying a plurality of series-connected coils together forming one of the phases of the device. Said device forms an electronically commutated axial-field motor of flat construction. Motors of this type are used increasingly, for example, for driving information discs which can be read without mechanical contact, such as optical discs or magnetic discs of magnetic disc storage units with aerodynamically floating magnetic heads (so-called Winchester drives).

In the known device the number of stacked substrates is always equal to or a multiple of the number of phases. To avoid loss of space the coils on each substrate are arranged on the substrates in a regular pattern which is as compact as possible. This pattern should correspond to the pattern of the magnetic poles of the rotor. This is because all the coils belonging to one phase are always energized at the same time. Thus, with the known device it is not possible to have a number of coils per phase differing from the number of rotor poles without loss of space. However, in many cases such a different number is desirable in order to minimize pulsations in the torque exerted on the rotor and, consequently, variations in the speed of movement of the rotor. This is of particular importance in the case of small motors having a low-mass rotor in order to guarantee the desired stable operation of the device.

Particularly in the case of a rotor of small dimensions the magnitude of the magnetic-field component contributing to the Loreritz forces depends strongly on the distance from the rotor. In the known device the driving force exerted on the rotor will therefore differ per phase, depending on the distance of the relevant substrate from the rotor, for a phase current of the same magnitude per phase. This has also an adverse effect on the stability of operation.

SUMMARY OF THE INVENTION

It is an object of the invention to provide a device of the type defined in the opening paragraph, which combines an effective use of the available space with a satisfactory stability of operation. To this end the invention is characterized in that the substrate carries all the phases.

The advantage of the invention is that the number of substrates used does not depend on the number of phases. Indeed, all the phases are present on each substrate. As required, the devices may be provided with a single substrate or a stack of a plurality of substrates.

Per substrate all the phases are situated in the same plane and hence at the same distance from the rotor. Therefore, also when a stack of a plurality of substrates is used all the phases always provide the same contribution to the driving force exerted on the rotor. This is because each phase comprises coils on all the substrates of the stack. In contradistinction to said known device the device in accordance with the invention may be provided with a rotor having eight or ten poles in combination with a stator having three phases and two coils per phase, i.e. with six coils on each side of a substrate. Likewise, it is possible to combine, for example, twelve poles with nine coils.

An advantageous embodiment of the invention is characterized in that the windings comprise electrically conductive tracks on the substrate, the interconnections comprise at least one electrically conductive track, and each interconnecting track is situated on the first side of the substrate for a first part and on the second side of said substrate for a second part. This embodiment enables the device to be manufactured using modem methods of forming tracks on a substrate, such as etching processes or photolithographic methods. By arranging the interconnecting tracks always partly on one side and partly on the other side of the substrate it is possible to use very compact and space-saving patterns, as will become apparent from the description with reference to the drawings.

Any coil with its interconnecting tracks and feedthrough connections to the other side of the substrate is identical to any other coil with its interconnecting tracks and feedthrough connections. Thus, identical current patterns per phase are obtained in operation. Even the feedthrough connections meet the requirements as regards the geometrical shift between the phases.

A further embodiment of the invention is characterized in that the rotor is rotatable about an axis, the coils are arranged uniformly around the axis in a regular pattern, the first and second coils substantially coincide in a projection parallel to the axis, each interconnecting track is situated on the first side for one half and on the second side for another half, and the interconnecting tracks form regular patterns which are identical in plan views of the first and the second side of the substrate.

A device of this construction has some important advantages for small and flat electric motors, for example for use in magnetic disc storage units. Such a disc storage unit has already been proposed in the prior non-published European Patent Application 92201654.8. The regular distribution of the coils enables a compact motor with a favourable operational stability to be obtained. Since each interconnecting track extends for one half on one side and for the other half on the other side of the substrate interconnecting tracks situated on the same side of the substrate need not extend adjacent one another anywhere on the substrate. This means that the only space to be reserved on the substrate for the interconnecting tracks is the space to accommodate a single interconnecting track. This will also become apparent from the description with reference to the drawings.

A further embodiment of the invention is characterized in that there are provided further electrically conductive tracks, and the further electrically conductive tracks comprise connection tracks at the ends of the phases for individually connecting each of the phases to external current supply means.

In this embodiment the ends of each of the phases are available for electrical connections. If the windings are, for example, arranged in star configuration the star point can be realized by external interconnection of the windings. However, if desired it is also possible to arrange the windings in another manner. Another possibility is to make the arrangement switchable with the aid of suitable external means, for example from a delta to a star configuration. If desired, each coil may be provided with a connection track for external connection. This freedom may be of importance for a device which upon starting from the stationary condition should be capable of delivering a larger driving force than at a later stage in which the device has already exceeded a given speed. This may be of great importance, for example, for a motor for the drive of a magnetic disc storage unit comprising a dynamic fluid beating and magnetic heads which are aerodynamically spaced from the disc.

A preferred embodiment of the invention is characterized in that the stator comprises a plurality of substantially identical stacked substrates, for each phase the ends of said connection tracks are situated at different sides of the substrate and coincide in a projection parallel to the axis, and the ends of like connection tracks on the facing sides of the substrates coincide and are electrically interconnected in such a manner that all the coils of each phase are connected in series with one another.

In this embodiment the patterns on the substrates may be wholly identical so that all the substrates can be manufactured by optical means using only a single mask design. Since the connection tracks are situated above one another magnetic stray fields caused by the electric currents in the connection tracks cancel one another. This means that externally there is in effect no contribution to undesired fields.

If desired a modification of this preferred embodiment may be used, which is characterized in that the stator comprises a stack of a plurality of substantially identical substrates, the stack comprises a plurality of sub-stacks, for each substrate the ends of said connection tracks are situated at different sides of the substrate and coincide in a projection parallel to the axis, in each sub-stack the ends of like connection tracks on the facing sides of the substrates coincide and are electrically interconnected in such a manner that in the sub-stack all the coils of each phase are connected in series with one another, and the sub-stacks are electrically connected to one another externally.

The sub-stacks may be arranged in parallel, temporarily or permanently, in order to obtain a, temporarily or permanently, higher driving force. For practical reasons it may then be advantageous to arrange the electrical connections of the sub-stacks geometrically spaced from one another.

BRIEF DESCRIPTION OF THE DRAWINGS

The invention will now be described in more detail, merely by way of example, with reference to the drawings, which show possible embodiments to which the invention is not limited and in which.

DETAILED DESCRIPTION OF THE PREFERRED EMBODIMENTS

Figure 1:
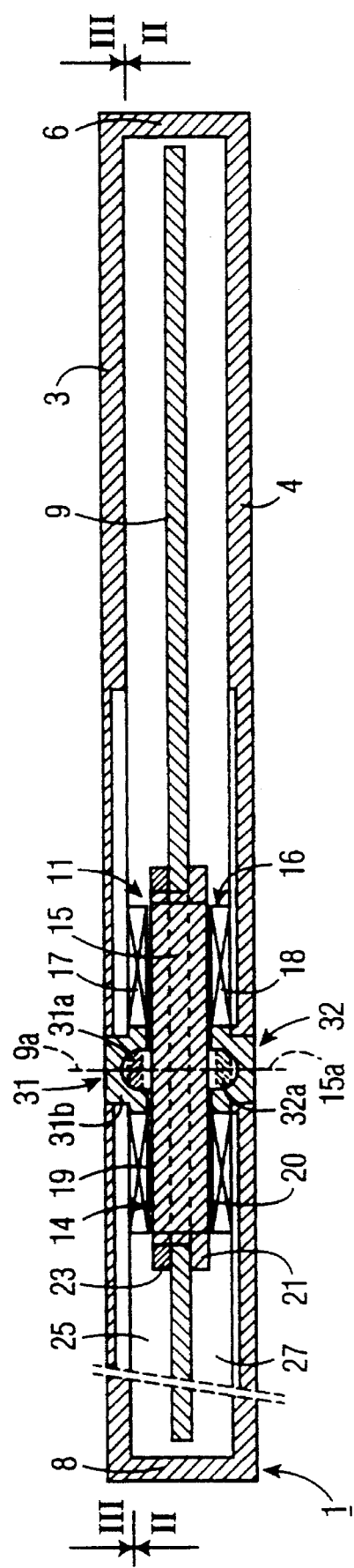
FIG. 1 is a diagrammatic sectional view showing an embodiment of the invention in the form of a data storage unit.
Figure 2:
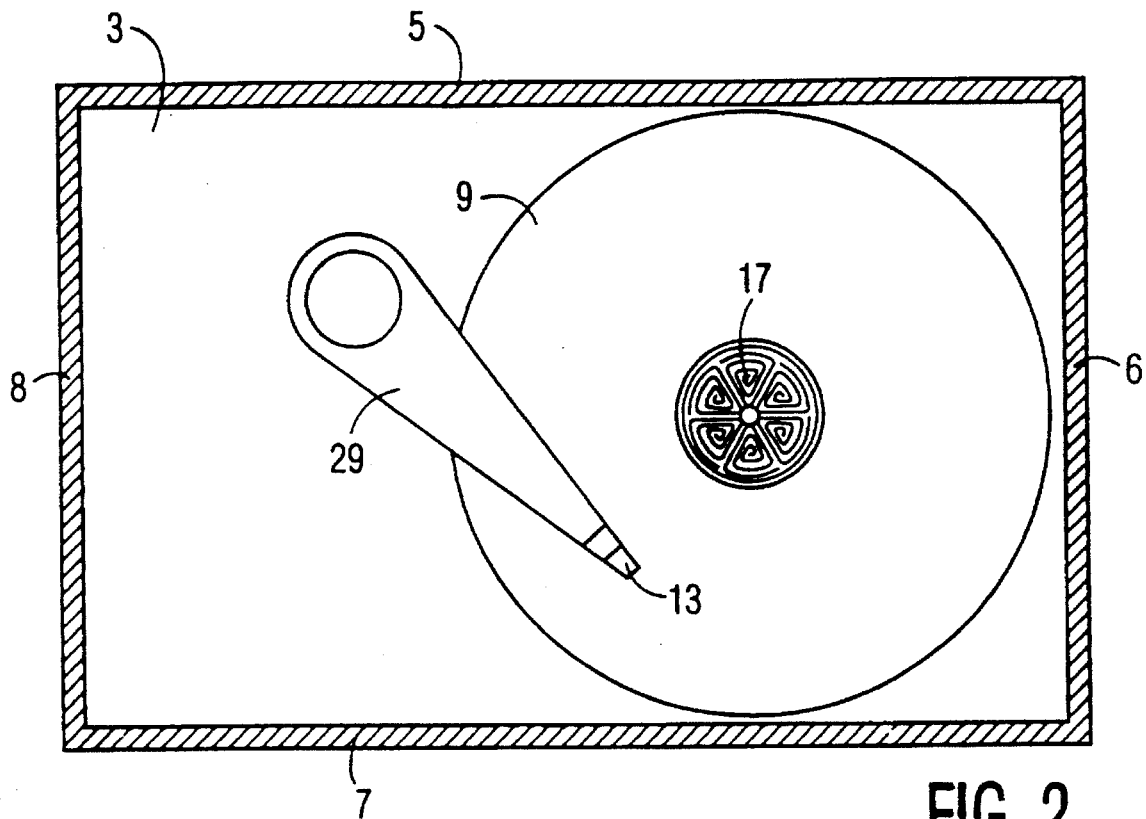
FIG. 2 is a sectional view taken on the line III—III in FIG. 1.

The data storage unit shown in FIGS. 1 and 2 comprises a housing 1 having two parallel main walls 3 and 4 and four side walls 5, 6, 7 and 8 interconnecting the main walls. The housing 1 forms an at least substantially imperforate cartridge accommodating an information disc 9 which is rotatable about an axis of rotation 9a, an electrical drive unit 11 for rotating the information disc 9, and a scanning device for scanning the information disc 9.

The drive unit 11 is constructed as an axial-field motor comprising a rotor 14 with a permanently magnetised multi-pole rotor magnet 15, preferably a high-energy magnet, for example of NdFeB. The stator 16 comprises two sections 17 and 18. The rotor magnet 15, which is rotatable about a rotor axis 15a which coincides with the axis of rotation 9a, is axially magnetised and opposite each of the stator sections 17 and 18 it has magnetic poles, in the present example eight. The stator sections 17 and 18 cooperate with the rotor magnet 15 via an air gap 19 and 20, respectively, and are arranged on the main walls 3 and 4, respectively.

In the present example the information disc 9 is a so-called magnetic hard disc comprising a base carrying on both sides a magnetic layer in which information has been stored or can be stored. The information disc has a central opening through which the rotor magnet 15 extends. An annular body 21, for example made of a material such as soft-magnetic iron, is arranged around the rotor magnet 15, on which body the information disc 9 is centred and is secured by means of a ring 23. The annular body 21 also shields the information disc 9 from stray flux produced by the drive unit 11.

In the present example the scanning device comprises one scanning unit 13 on each side of the information disc 9. Each scanning unit 13, which is situated in a space 25 or 27 between the information disc 9 and one of the respective main walls 3 or 4, comprises a magnetic head, arranged on a pivotal arm 29, for writing and/or reading information.

The data storage unit comprises bearing means for supporting the rotor 14 and the information disc 9 secured to this rotor relative to the housing 1. The bearing means comprise two hydrodynamic spiral-groove beatings 31 and 32, each comprising a bearing member 31a and 32a, respectively, shaped as a segment of sphere, and a bearing member 31b and 32b, respectively, shaped as a hollow segment of sphere. The bearing members 31a and 32a, which each have a smooth bearing surface, are secured to the rotor 14. The bearing members 31b and 32b each have a bearing surface formed with a groove pattern and are secured to the main walls 3 and 4, respectively. During rotation of the rotor 14 the groove patterns produce a pressure build-up in a medium, such as grease or oil, present between the bearing surfaces of the respective spiral-groove bearings 31 and 32.

Figure 3:
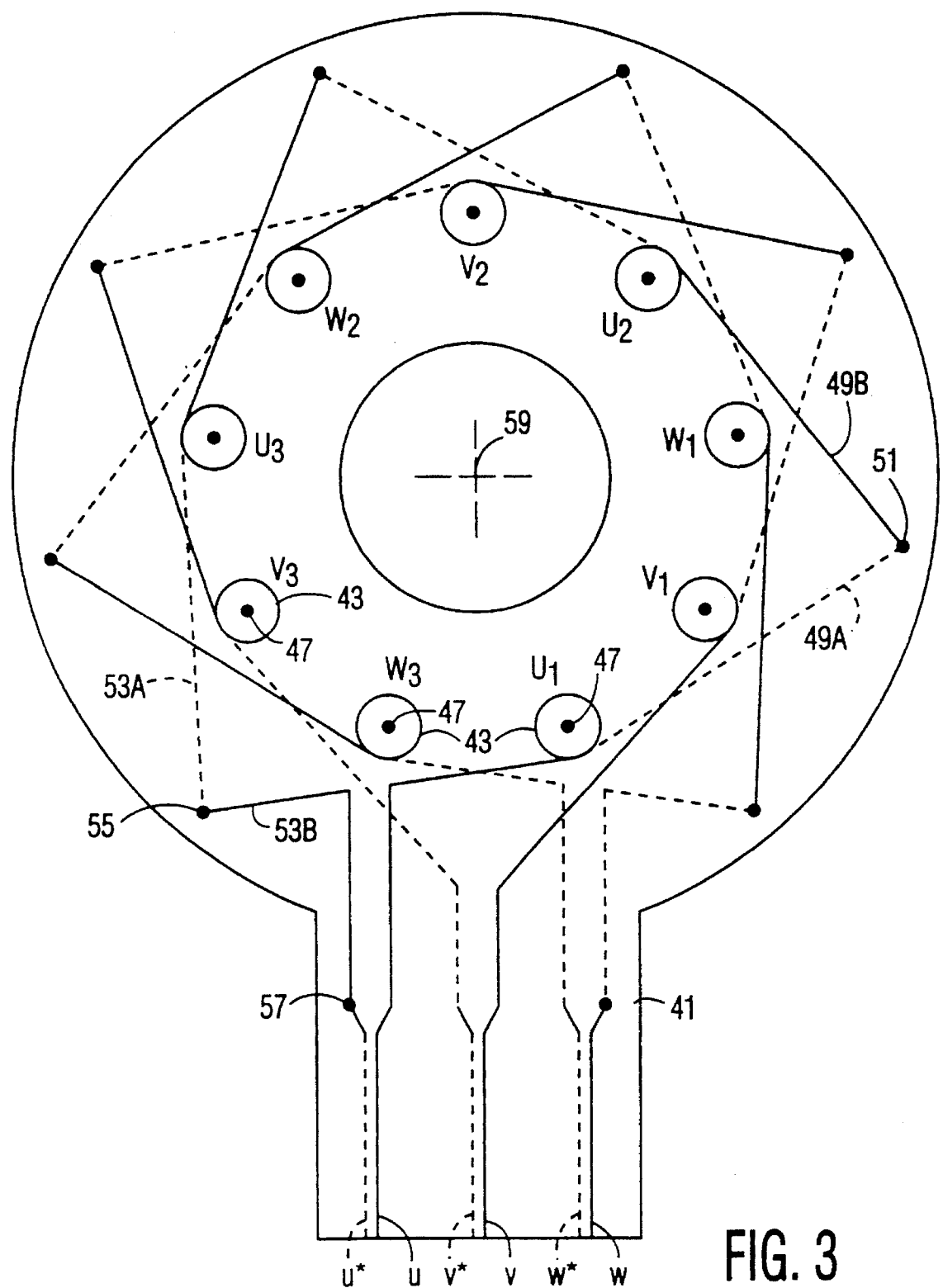
FIG. 3 is a view of a substrate in the form of a foil with a diagrammatically shown conductor pattern.

Each section 17 or 18 of the stator 16 comprises a plurality of substrates such as a substrate 41, which may be implemented as a foil as is illustrated diagrammatically in FIG. 3, which shows an embodiment having a number of windings differing from that in FIG. 2.

Figure 4:
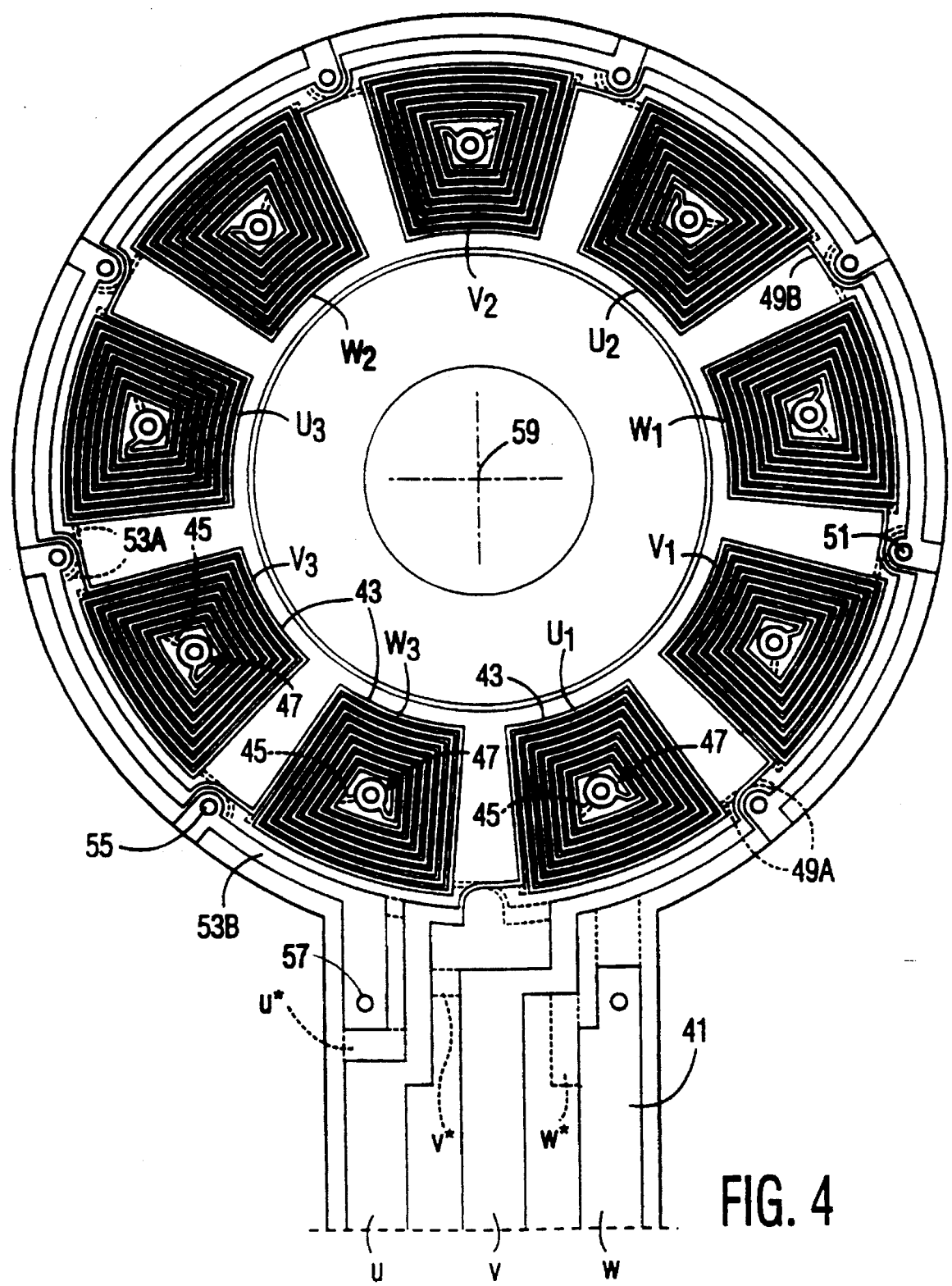
FIG. 4 is a view of a foil with a conductor pattern in accordance with the diagram of FIG. 3.

The diagrammatic method of representation in FIG. 3 has the advantage that the invention can be explained more easily. In reality, the substrate carrying the windings will be as shown in FIG. 4. Since FIGS. 3 and 4 show the same part diagrammatically and in a practical representation, respectively, the same references are used in FIGS. 3 and 4.

Figure 5:
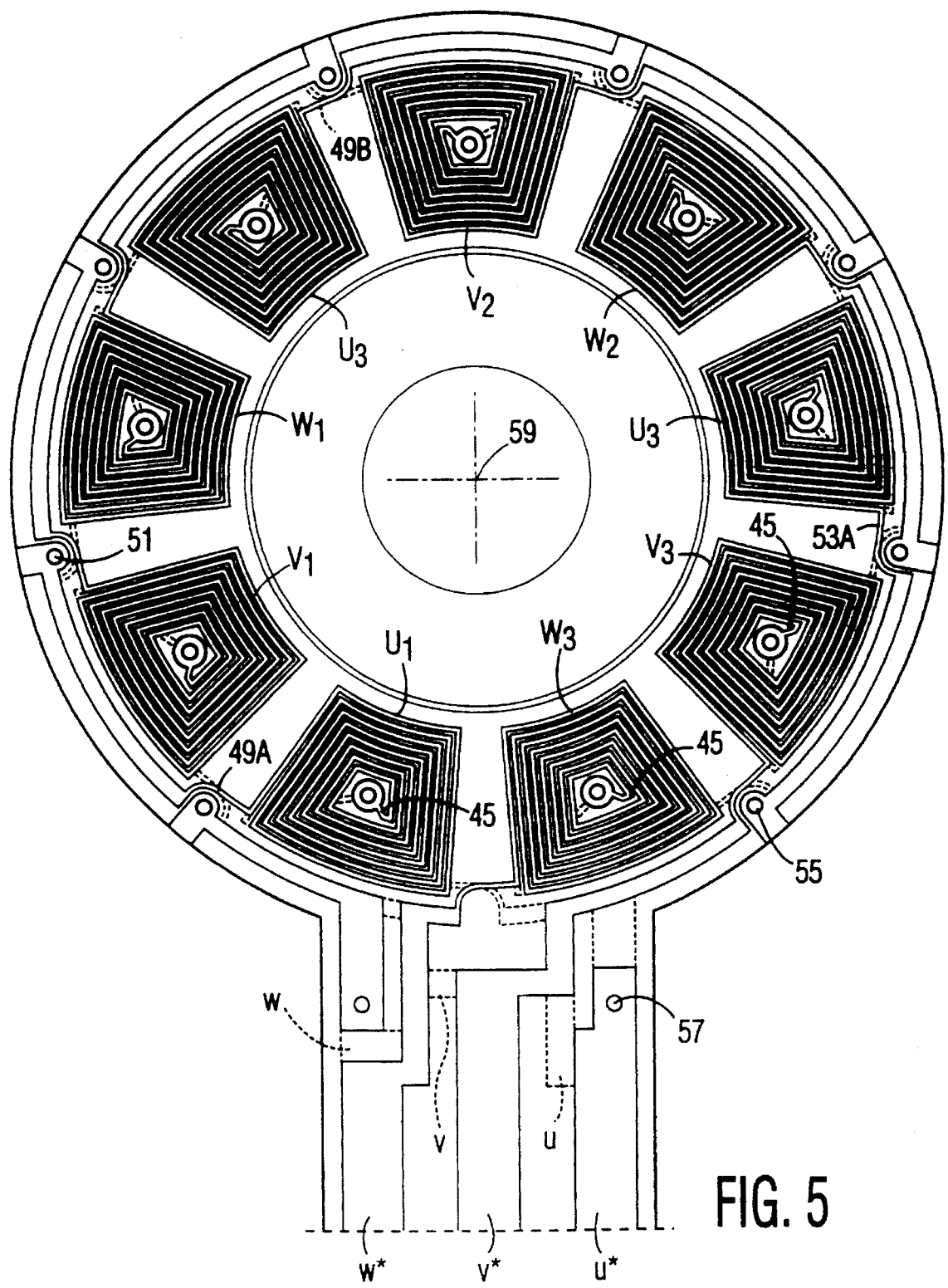
FIG. 5 is a view of the other side of the foil shown in FIG. 4.

The substrate 41 consists of an electrically insulating material, for example polyimide. On both sides the substrate has a suitably conductive metal layer, for example of copper. By means of a mask and a suitable photolithographic method a coil pattern is generated by first copying the desired pattern in a photoresist coated onto the metal layers, after which the patterns are etched out. The electromagnetic stator has a plurality of windings each comprising spiral first coils 43, electrically interconnected in series via interconnections, on a first side of the substrate 41 and, situated opposite these coils, second coils 45, hardly visible in the drawings, on the opposite second side of the substrate. FIG. 5 is a view at the first side of the substrate 41. Each coil 43 spirals from the outside toward its centre and a central feedthrough connection 47 connects it to the centre of a second coil 45 on the second side of the substrate 41, which second coil spirals outwardly from its centre. In projection the pattern of the second coil coincides exactly with the pattern of the first coil. Thus, each first coil 43 is serially interconnected to a second coil 45 on the other side. Associated first and second coils together form windings. In FIG. 3, which as already stated diagrammatically represents the part of the stator shown in FIG. 4, the windings have been referenced $W_1$, $W_2$, $W_3$, $U_1$, $U_2$, $U_3$ and $V_1$, $V_2$, $V_3$. The windings $U_1$ to $U_3$ are serially interconnected and form a first phase. Likewise, the windings $V_1$ to $V_3$ and $W_1$ to $W_3$ form a second and a third phase, respectively. Each phase having ends and can be connected to external current supply means by two connection tracks provided on the substrate 41. In FIG. 3 the conductors arranged on the first side of the substrate 41 are shown in solid lines. Conductors situated on the opposite second side of the substrate are shown in broken lines. The connection tracks for the first phase comprising the windings $U_1$, $U_2$, $U_3$ are formed by the tracks u and u*, respectively. The phases formed by the windings $V_1$ to $V_3$ and $W_1$ to $W_3$ can be connected via the connection tracks v, v* and w, w*, respectively. For convenience these three phases will be referred to hereinafter as the phases U, V and W.

Starting from substrates 41 provided with interconnected phase windings it is possible to construct a stator of an electric motor from one or more stacked substrates 41. This enables the same substrate provided with the same coil pattern to be used for different motors of different power ratings. In this respect it is not essential that the windings are formed by electrically conductive tracks. According to the invention it is also possible to start from wire-wound windings and filamentary windings.

As already stated, FIG. 4 shows an embodiment in which the windings consist of electrically conductive tracks on the substrate 41. The interconnections are also formed by electrically conductive interconnecting tracks, each interconnecting track in the present embodiment being arranged on the first side of the substrate 41 for a first part and on the second side of this substrate for a second part. The connection track U is connected to the outer end of the coil 45 of the winding $U_1$. The central feedthrough connection 47 connects the coil 43 to a coil 45 on the other side. At the periphery the outer end of this second coil of the winding $U_1$ is electrically interconnected to the first coil on the first side of the substrate 41 of the winding $U_2$ via an interconnection 49a, 49b. The part 49a of the interconnection is situated on the second side of the substrate 41 and the part 49b on the first side. The two parts 49a, 49b are interconnected via an electrically conductive feedthrough connection 51 which extends through the substrate 41. The coils belonging to the windings $U_2$ and $U_3$ are interconnected in a similar way, the outer end of the second coil of the winding $U_3$ situated on the second side of the substrate 41 being electrically connected to the connection track u* by an interconnection 53a, 53b via two feedthrough connections 55 and 57 which extend through the substrate. The windings belonging to the phases V and W are electrically connected to one another and to the connection tracks v, v* and w, w* in a similar manner.

The substrates 41 provided with the coil patterns and conductor patterns shown in FIG. 4 are intended for motors having a rotor which is rotatable about an axis through the centre 59. The coils are arranged in a regular pattern around the centre 59. In a projection parallel to an axis through the centre 59 and perpendicularly to the substrate the first and second coils 43 and 45, respectively, substantially coincide with each other. The interconnecting tracks 49a, 49b etc. are situated on different sides of the substrate and have substantially the same length, so that the interconnecting tracks are situated on the first side for one half and on the second side for another half. The two parts are interconnected by an electrical feedthrough connection which traverses the substrate, such as the feedthrough connection 51 or 55. The interconnecting tracks also form a regular pattern. These regular patterns have been selected in such a way that they are identical in plan views of the first side and the second side of the substrate. To illustrate this, FIG. 5 shows the second side of the substrate 41 with the coil pattern and conductor pattern arranged thereon.

The substrates as shown in FIGS. 3 to 5 provided with the respective patterns are very suitable for forming a stator for an electrodynamic device, which stator comprises a stack of a plurality of identical or at least substantially identical substrates. In a projection parallel to an axis perpendicular to the drawing in projection the ends of the connection tracks u, v and w on the first side of each substrate coincide with the ends of the connection tracks u*, v* and w*. As a result, it is very simple to connect all the coils of each phase in series with one another on the different substrates by making the ends of like connection tracks on facing sides of the substrates coincide and electrically interconnecting them. For example, a connection track U of one substrate can be positioned directly underneath a track u* of a second substrate, after which the respective tracks v, w and v*, w* on the two substrates are also situated opposite one another and can directly be interconnected electrically in an easy manner. This yields a stator whose phases each comprise coils in each of the stacked substrates in a perfectly symmetrical manner.

Figure 6:
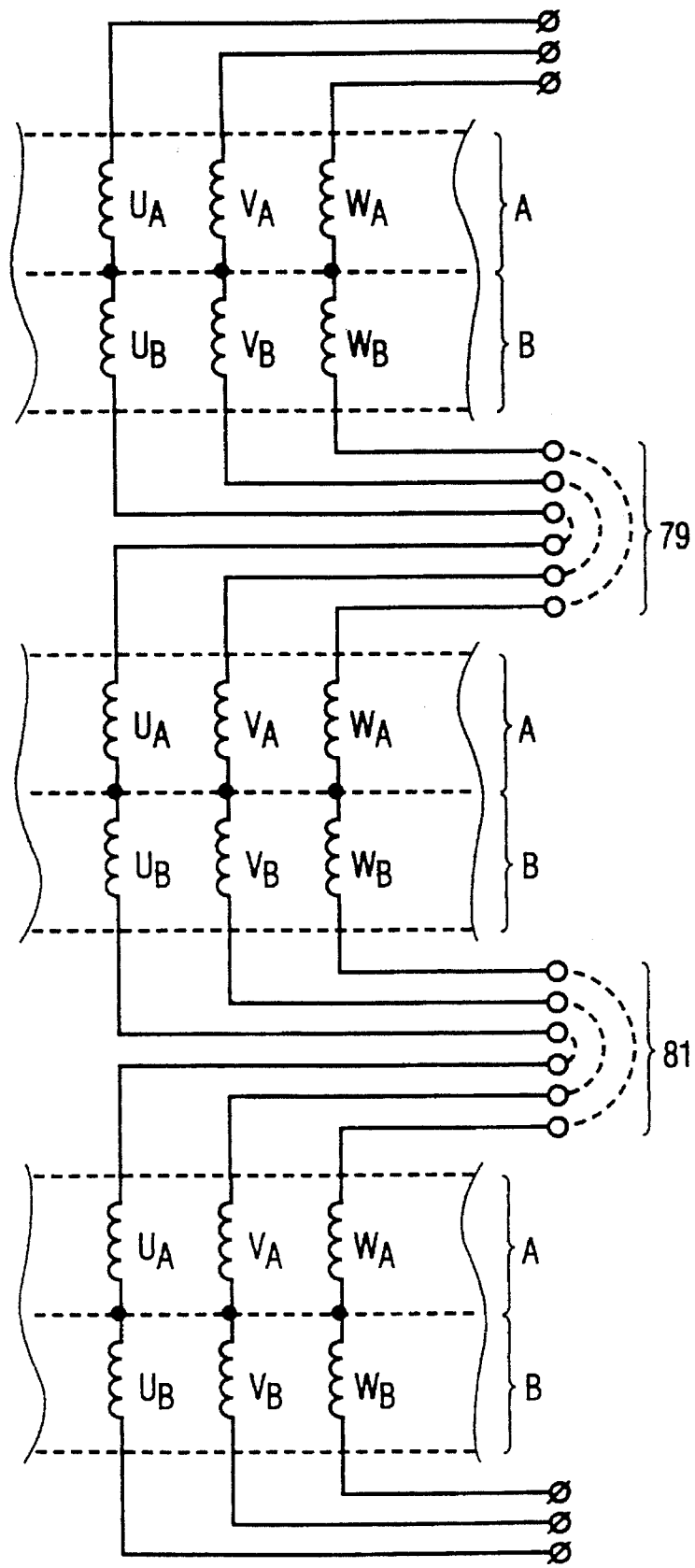
FIG. 6 is a diagram of a stator comprising three sub-stacks I-III of substrates.

Another possibility is obtained by again forming a stack of a plurality of substantially identical substrates 41, which stack now comprises a plurality of substacks. FIG. 6 is a diagram of such a stator comprising three sub-stacks I, II and III. In the same way as in the embodiment just described the ends of the connection tracks of each substrate at different sides coincide in a projection parallel to the rotor axis. In each sub-stack, just as described above, the ends of like connection tracks on the facing sides of the substrates are situated above one another and are electrically interconnected so that all the coils of a phase are connected in series with one another in the sub-stack. In the diagram shown in FIG. 6 it is assumed that each of the sub-stacks comprises two substrates A and B. The windings U of the substrate A are connected in series with one another to form a phase $U_A$. Likewise, the substrate B carries a phase $U_B$. The same applies to the windings V and W so that the stack I also comprises phases $V_A$, $V_B$ and $W_A$, $W_B$. This also holds for the stacks II and III. Externally the sub-stacks I to III are electrically connected in series with one another by means of the connections 79–81, which are represented symbolically in broken lines.

Figure 7:
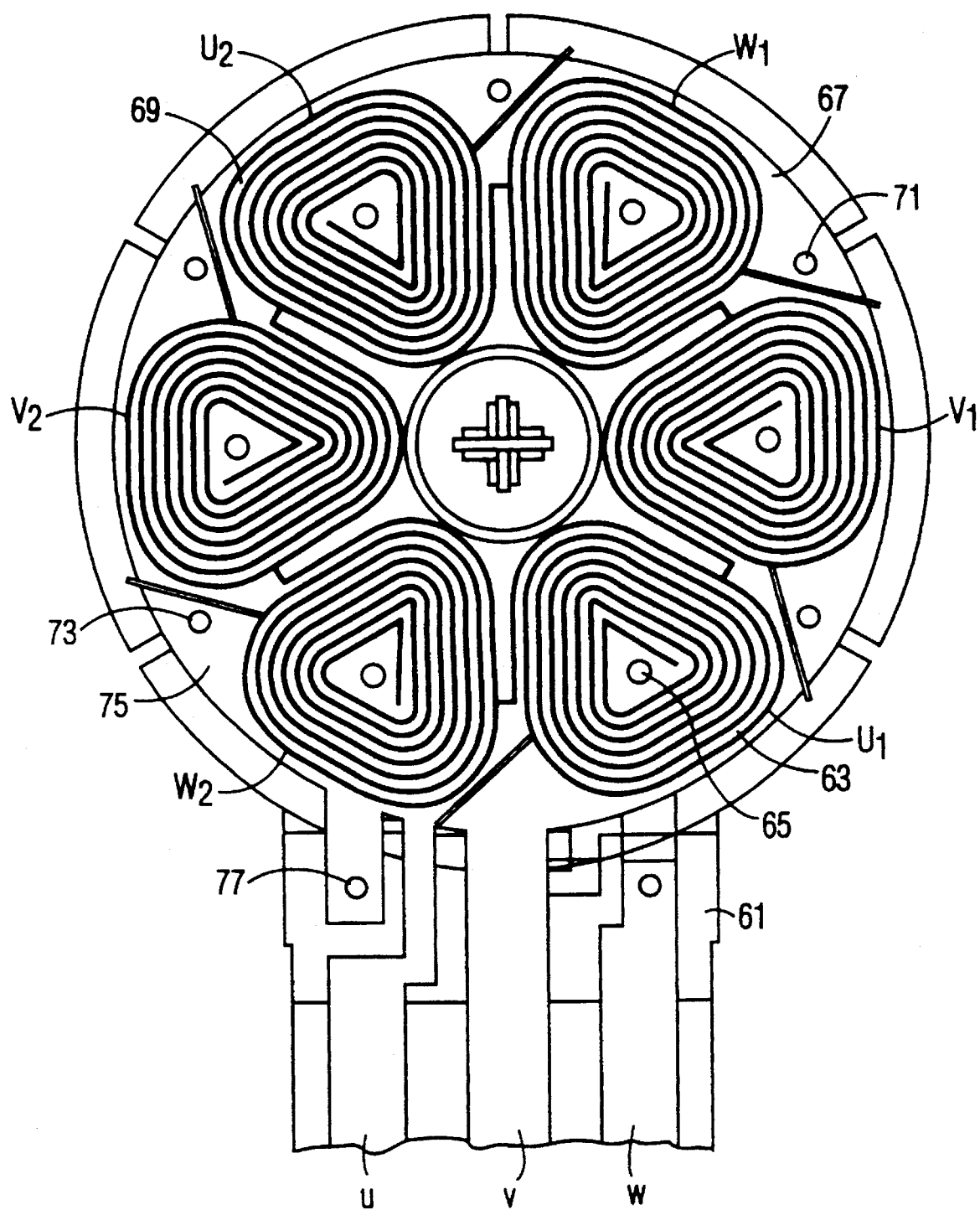
FIG. 7 is a view of a foil with a deviating conductor pattern.

FIG. 7 shows another example of a substrate having a coil pattern for a device in accordance with the invention, the coils on opposite sides of the substrate 61 being interconnected similarly to those in FIG. 6 and interconnecting tracks being provided to connect the coils in series with one another so as to form phases U, V and W comprising two windings each. The connection track u is connected to the coil 63, which is centrally connected to the centre of a second coil, not shown, on the other side of the substrate 61 via an electrical feedthrough connection 65 passing through the substrate. This second coil of the winding $U_1$ is connected to the first coil 69 of the winding $U_2$ via an connection 67. The connection is made via a feedthrough connection 71 which passes through the substrate and which is connected to the second coil of the winding $U_1$ via a further connection track arranged on the opposite side of the substrate. The coil, not shown, situated on the other side of the substrate and belonging to the second winding $U_2$ is similarly connected to the connection track opposite the connection track u on the other side of the substrate by a conductive track on the second side via a feedthrough connection 73 and a connection 75. The windings belonging to the phases V and W are similarly connected to the connection tracks v, w and the tracks situated opposite thereto on the other side of the substrate 61. In the embodiment shown in FIG. 7 the coils as well as the interconnections and connection tracks again form regular patterns, so that the substrates in FIG. 7 can be used in a manner similar to those in the embodiments described hereinbefore with reference to FIG. 4.

Figure 8:
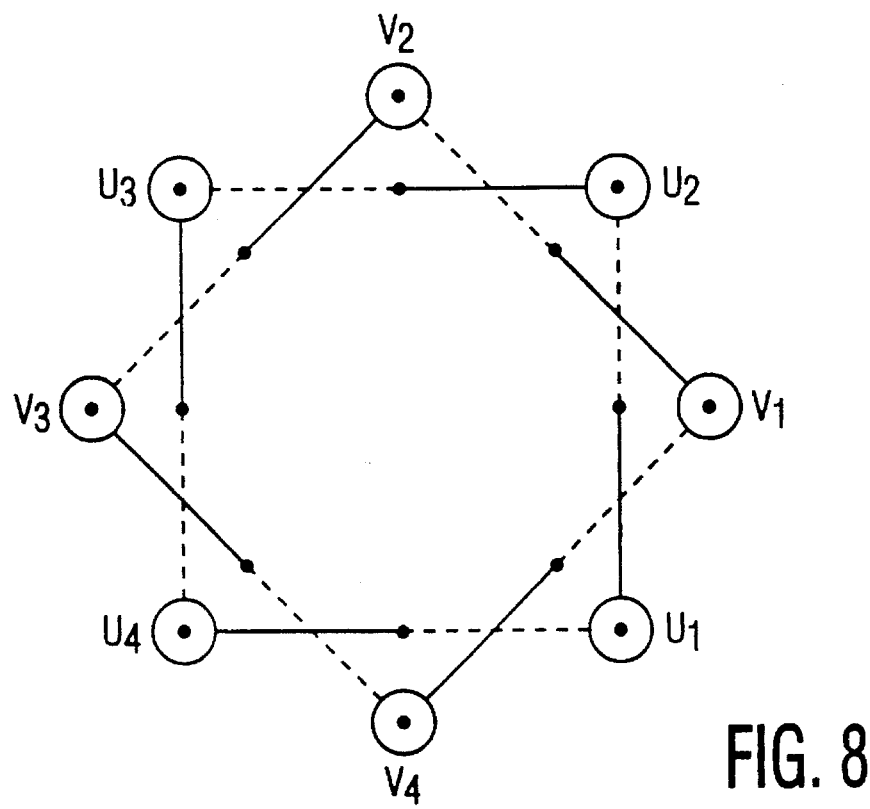
FIG. 8 is a diagram similar to FIG. 3 but showing a deviating conductor pattern.

To illustrate that by means of the inventive concepts it is also possible to manufacture electrodynamic devices which differ from the examples described hereinbefore FIG. 8 very diagrammatically shows that it is also possible to use substrates carrying two phases U and V each comprising four windings $U_1$ to $U_4$ and $V_1$ to $V_4$, respectively. In the present case it is also possible to realize highly regular patterns of both the coils and the electrically conductive interconnecting tracks.

Further advantages of the invention, which have not yet been mentioned hereinbefore, may be obtained depending on the actual implementation and the field of use. Further advantages may also become apparent upon a comparison of the invention with prior-art other than cited.

Although the invention has been described hereinbefore with reference to the drawings this does not imply that the invention is limited to the embodiments shown in the drawings. The invention likewise relates to all embodiments which deviate from those shown in the drawings but fall within the scope defined by the Claims and utilize the basic idea of the invention, which entails that all the phases are present on each substrate in an electrodynamic device having a permanent-magnetic rotor and windings arranged on one or more substrates.

For example, in contradistinction to what is shown in the drawings, it is possible to use the invention in a translatory motor. It is also possible to use entirely different coil patterns and different numbers of windings.

In contrast to what is shown in FIGS. 4 and 5 the interconnecting tracks may be arranged at the side facing the axis of rotation instead of at the side which is remote from the axis of rotation.

I claim:

1. An electrodynamic device comprising:

a movable permanent-magnet rotor (14) and an electromagnetic stator (16) comprising:

a substrate (41) having a first side and an opposite second side, a plurality of windings ($U_1$–$U_3$, $V_1$–$V_3$, $W_1$–$W_3$), each one of said plurality of windings comprising a spiral first coil (43) which is situated on the first side of the substrate and a spiral second coil (45) which is situated on the opposite second side of the substrate, said first and second coils being electrically connected in series with one another via an interconnection through said substrate, and a plurality of phases (U, V, W) each comprising at least one said winding and having ends, characterized in that the substrate carries all the phases (U, V, W).

2. An electrodynamic device as claimed in claim 1, characterized in that the windings ($U_1$–$U_3$, $V_1$–$V_3$, $W_1$–$W_3$) comprise electrically conductive tracks on the substrate (41), said interconnection of each one of said plurality of windings comprises at least one electrically conductive track (49A, B), and each said at least one electrically conductive track of an interconnection is situated on the first side of the substrate (41) for a first part and on the second side of said substrate for a second part.

3. An electrodynamic device, comprising:

a movable permanent-magnet rotor (14) and an electromagnetic stator (16) comprising:

a substrate (41) having a first side and an opposite second side, a plurality of windings ($U_1$–$U_3$, $V_1$–$V_3$, $W_1$–$W_3$) comprising spiral first and second coils (43, 45) which are electrically connected in series with one another via interconnections and which are situated, respectively, on the first and the opposite second side of the substrate, and a plurality of phases (U, V, W) each comprising at least one said winding and having ends, characterized in that;

the substrate carries all the phases (U, V, W), the windings ($U_1$–$U_3$, $V_1$–$V_3$, $W_1$–$W_3$) comprise electrically conductive tracks on the substrate (41), said interconnections comprise at least one electrically conductive track (49A,B), each said at least one electrically conductive track of an interconnection is situated on the first side of the substrate (41) for a first part and on the second side of said substrate for a second part, the rotor is rotatable about an axis, the coils (43, 45) are arranged uniformly around said axis in a regular pattern, the first and second coils (43, 45) substantially coincide in a projection parallel to said axis, each said at least one electrically conductive track of an interconnection (49A, 49B) is situated on the first side of said substrate for one half and on the second side of said substrate for another half, and said at least one electrically conductive track of said interconnections form regular patterns which are identical in plan views of the first and the second side of the substrate (41).

4. An electrodynamic device as claimed in claim 3, characterized in that there are provided further electrically conductive tracks, and the further electrically conductive tracks comprise connection tracks (u, u*; v, v*; w, w*) at said ends of said phases for individually connecting each of said phases to external current supply means.

5. An electrodynamic device as claimed in claim 4, characterized in that the stator comprises a plurality of substantially identical stacked substrates, connection tracks each have ends and for each phase said ends of said connection tracks (u, u*; v, v*; w, w* are situated at different sides of the substrate and coincide in a projection parallel to said axis, and said ends of like connection tracks on facing sides of the substrates coincide and are electrically interconnected in such a manner that all the coils of each phase are connected in series with one another.

6. An electrodynamic device as claimed in claim 4, characterized in that the stator comprises a stack of a plurality of said substrates which are substantially identical, said stack comprises a plurality of sub-stacks, for each said substrate said ends of said connection tracks are situated at different sides of the substrate and coincide in a projection parallel to said axis, in each said sub-stack said ends of like connection tracks on facing sides of the substrates coincide and are electrically interconnected in such a manner that in the sub-stack all the coils of each phase are connected in series with one another, and said sub-stacks are electrically connected to one another externally.

\* \* \* \* \*